Feb 14, 1933.   J. W. WEINLAND   1,897,091

ANCHOR DEVICE FOR AIR BRAKE RETAINER VALVES

Filed April 10, 1930

INVENTOR.
Joseph W. Weinland
BY
William J. Jackson
ATTORNEY.

Patented Feb. 14, 1933

1,897,091

UNITED STATES PATENT OFFICE

JOSEPH W. WEINLAND, OF PHILADELPHIA, PENNSYLVANIA

ANCHOR DEVICE FOR AIR BRAKE RETAINER VALVES

Application filed April 10, 1930. Serial No. 443,035.

An air brake retainer valve and its anchor are coordinate parts of air brake mechanism, just as important and necessary for the satisfactory operation of the air brake as any part of the air brake mechanism. It is essential that the anchor for the retainer valve properly function for the air brake to work to best advantage.

The function of the retainer valve is to retain a pressure of air in the air brake cylinder, while the air in the train line is being replenished from the locomotive. It is operated by trainmen for the purpose of controlling movement of train on grades of various degrees in hilly or mountainous localities.

Safety appliance laws require that brakes on railroad cars be at all times in good working order, for the safety of trains and the lives of trainmen. Where brakes are not effective, or in good working order, such a condition is a penalty defect, resulting in fines against the carrier.

Both lag screws and bolts have been used as fastening members. The retainer valve is located on the outside end of the car and near the top of the car. On some types of freight cars of wooden end construction, the retainer valve is fastened on to the car by the use of lag screws; on other cars of same type of construction, bolts are used. On cars of steel end construction, or steel end plate construction, bolts are used as fastening members. Such bolts extend from the inside of the car.

These and other methods of fastening retainer valves to cars are unsatisfactory. Wood shrinks; the car vibrates and rocks under train and switching service conditions, throwing a strain on these fastenings.

The A. R. A. have fixed charges for removing any part of a car while car is under load; and where it is necessary to enter the car to make repairs to a retainer valve on a car, for instance, loaded with grain, it becomes necessary to shift the loading to make the repairs and the car owner must pay the costs. Where a retainer valve is anchored in accordance with my design of anchor device removal is accomplished without entering the car.

My anchor device is so designed as to permit a permanent fastening to the freight car after which the retainer valve may be attached or removed as frequently as desired without disturbing the fastening or rigidity of the anchor.

The main object of my invention is to provide a means whereby a retainer valve may be applied to a car as frequently as necessary or desired, without the need of entering the inside of the car each time in order to make removals and re-applications of the retainer valve. This is accomplished by rigidly fastening an anchor plate to the car and on which plate the valve may be placed and removed at will through accessibility from the outside of the car.

A further object is to provide spacers which permit the car owner to fix the distance from the face of the car to the face of the anchor plate according to varying needs. Once this distance is determined, spacers of proper length are then provided and the anchor plate is permanently fastened to the car. These spacers are preferably of pipe, but not necessarily so. However, a pipe spacer is perhaps the best, as pipe is carried in stock by all railroads and builders and by using pipe spacers it is a simple matter to provide spacers of proper length without delay and at the lowest possible cost.

A further object is to provide an anchor plate made of steel or other metal in which holes for fastening to the car are provided and in which slots are also provided for use in attaching and detaching the valve to the anchor plate, and in which spacers, preferably but not necessarily of pipe, and bolts and nuts or rivets for fastening the plate rigidly to the car, the bolts or rivets passing through the holes in the plate and through the pipe or other spacers.

Another object is to provide a structure where should a car owner want the face of the anchor comparatively close to the car or a greater distance from the face of the car (at the top where the valve is anchored) then the same may be readily accomplished.

A further object is to provide a structure wherein a single design of anchor plate will serve for all conditions and the varying distances required are simply and readily taken care of by merely using a slightly longer or shorter spacer as the case may be. With any and all other designs which I have ever seen a distinct and separate pattern of anchor is necessary in order properly to meet these varying distance conditions; or, as an alternate, to avoid a variety of patterns, the car owner would have to bend his pipe, which is not desirable.

A further object is to provide a structure in which spacing is permitted to any dimension necessary by providing ferrule spacers fixed for all classes of cars and conditions regardless of clearance requirements, and this in turn permits a car owner to carry a single type in stock, thus aiding in keeping his inventory down and avoiding the danger of running out of stock of a given pattern. The ferrule or pipe spacer is cut to the length desired and varies according to the distance the car owner wishes the face of the anchor plate to become fixed in its relation to the face of the car.

A further object is to provide a structure that the car owners may have on hand at all times so that special spacers need not be carried in stock.

Another object of the present invention is to provide a construction that provides the maximum in efficiency and the minimum in production, cost, and weight, and the minimum in parts to be carried in user's stock.

A still further object is to provide a structure in which its open construction upon four sides serves to prevent the accumulation of ice, snow, and moisture with a consequent lessened tendency toward corrosion.

It is important to provide an anchor for an air brake retainer valve which will provide a rigid support or holder for the valve, and it thus became necessary to place the anchor plate as close to the face of the car end as possible. This leaves little clearance between the outer face of the car and the inner face of the anchor plate, so that, as now practiced, conventional bolts employed to attach the retainer valve to the anchor plate must be introduced behind the anchor plate in a substantially vertical position and moved outwardly through the anchor plate so that the retainer valve may be attached thereto. This is an awkward and troublesome procedure and, in the case of a steel freight car having a corrugated end, is not practical. It is a still further object of the present invention to overcome this disadvantage and provide an anchor plate so arranged and constructed that it may be placed immediately adjacent the end wall of a freight car of either wooden or steel construction so that conventional bolts may be introduced through the outer face of the anchor plate for retainer valve attachment.

A still further object of the present invention resides in the provision of a structure of the character stated arranged, connected, constructed and designed for accomplishing the results sought by the foregoing objects.

The invention consists of the novel construction hereinafter described and finally claimed.

The nature, characteristic features and scope of the invention will be more fully understood from the following description taken in connection with the accompanying drawing forming part hereof, and in which.

For the purpose of illustrating my invention I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
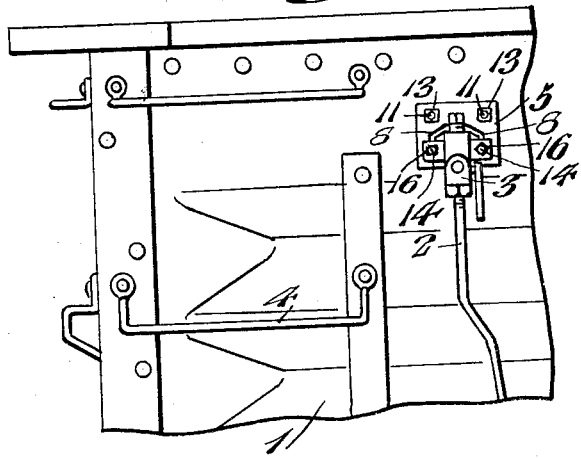
Fig. 1 is a fragmentary view in end elevation of a steel freight car equipped with an anchor device embodying the invention.
Figure 2:
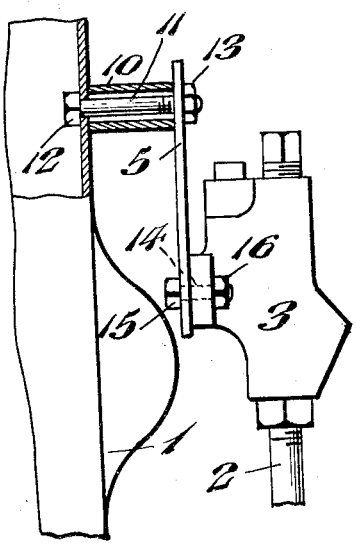
Fig. 2 is a fragmentary view in cross-section of the anchor device shown in Fig. 1.
Figure 4:
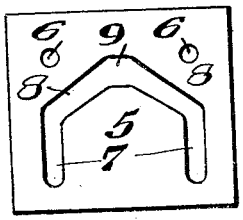
Fig. 4 is a view in elevation of the anchor plate.

In the drawing, and referring to Figs. 1, 2, and 4, the reference numeral 1 designates a steel car construction having a corrugated end and which may be of any type used by railroads. The pipe 2 leading from the air brake system of the car extends to a point near the top of the car on the upper end of which is secured the retainer valve 3 in convenient reach of the operator from the top of the car 1 or while standing on the usual car ladder 4. The reference numeral 5 designates the anchor plate which is of thin, flat metal and of rectilinear configuration. This anchor plate 5 is provided adjacent its top with bolt accommodating apertures designated 6, see Fig. 4. The anchor plate is also provided upon opposite sides of the vertical medial line thereof with vertically disposed slots 7 disposed in alignment with the apertures 6. As shown in Fig. 4, the upper ends of these slots 7 are joined or connected by slots 8 arranged at an inclination, which slots 8 at their juncture with one another are provided with the enlarged slotted part 9.

With the anchor plate 5 rigidly clamped to the car end by the bolts 11 and nuts 13 attachment of the retainer valve 3 is accomplished through the medium of conventional bolts 14 having heads 15. The heads 15 of the bolts 14 are introduced through the enlarged opening 9 in the outer face of the anchor plate 5, see full lines in Fig. 5, and the bolts then moved along the inclined slots 8 to the position in slots 7 shown in dotted lines in said figure, in which position the bolts are ready to receive the retainer valve 3, the attachment being effected by means of the nuts 16. It is thus apparent that conventional bolts may be introduced through the front face of the anchor plate endwise and thereafter moved sidewise to proper position. This is an important feature, particularly in case of steel cars having corrugated ends as shown in Figs. 1 and 2, where the corrugated portions make for a restricted space between the outer face of the car and the inner face of the anchor plate.

Figure 3:
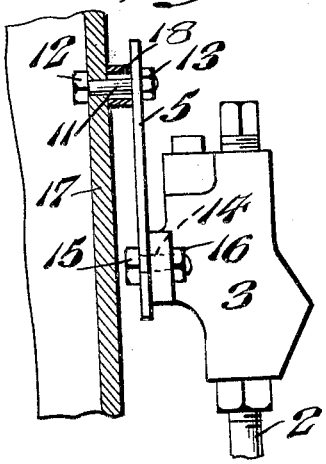
Fig. 3 is a view similar to Fig. 2 but illustrating a wooden car structure.

The construction shown in Fig. 3 is the same as that shown in Figs. 1 and 2, except that the car 17 is of wood and the ferrule 18 is relatively short so that the space between the outer face of the wooden car 17 and the inner face of the anchor plate 5 is no larger than is required to accept the head 15 of the bolt 14. The retainer valve can thus be clamped to place very close to the car and to provide rigidity. This is an important feature, enabling the car owner to place the plate at a minimum distance from the face of the car, as shown in Fig. 3.

Figure 5:
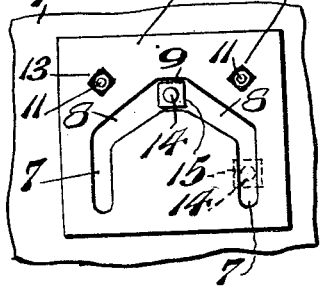
Fig. 5 is a view illustrating the manner of attaching conventional bolts to the anchor plate.
Figure 7:
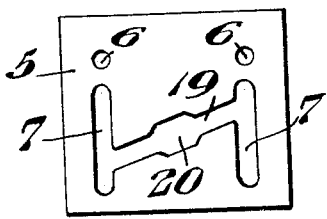
Figs. 7, 8, 9, and 10 are views in elevation illustrating slightly modified forms of the anchor plate.

Referring now to the modified form of anchor plate shown in Fig. 7, the vertical slots 7 are connected intermediate their height by an inclined cross slot 19 having an enlarged opening 20 for the insertion of the nut 15 of a conventional bolt 14. Thus, the slot arrangement is substantially H-shaped instead of inverted V-shape as shown in Figs. 4 and 5.

Figure 8:
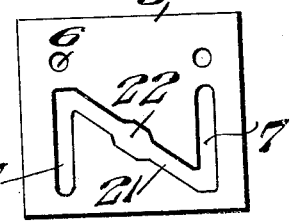

In Fig. 8 the modified form of anchor plate 5 shows the vertical slots 7 connected top and bottom by an inclined cross slot 21 having an enlarged opening 22 to receive the nut 15 of the bolt 14. The slot arrangement thus provides a substantially N-shaped configuration.

Figure 9:
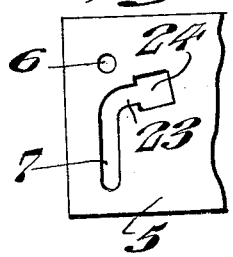

In Fig. 9 each slot 7 is provided at its top with a short cross slot 23 and an enlarged nut receiving opening 24.

Figure 10:
Figure 6:
Fig. 6 illustrates in perspective the short pipe sections or ferrules shown in Figs. 2 and 3 respectively.

In Fig. 10 each vertical slot 7 is provided at its top with a cross slot 25 which is extended outwardly through the edge of the plate to permit free passage of a conventional bolt 14 to slot 7.

What I claim is:

1. An arrangement of the character stated comprising in combination a railway car, an air brake retainer valve supporting plate of thin, flat, rectangular shape adapted to be supported upon the car end, which plate is apertured adjacent one edge and is slotted upon opposite sides of the medial, vertical line of said apertures, tubular distance pieces arranged between said plate and car end, bolts passing through the car end, distance pieces and the apertures of said plate, the heads of said bolts being arranged within the car, nuts attached to said bolts for securing said parts together, a retainer valve, and means cooperative with the slots of said plate for securing vertical adjustment of said retainer valve with respect to said plate.

2. An arrangement of the character stated comprising in combination a railway car, an air brake retainer valve anchor plate supported upon the car end, which plate is apertured adjacent one horizontal edge and is slotted upon opposite sides of the medial vertical line of said aperture, said slots being connected by a cross slot, tubular distance pieces arranged between the car end and said plate, bolts passing through the car end, distance pieces and apertures of said plate, the heads of said bolts being arranged within the car, nuts attached to said bolts for securing said parts together, a retainer valve, and conventional bolts for securing said valve with respect to the vertical slots of said plate, the said cross slot being sufficiently large to permit endwise insertion of said conventional bolts from the outer face of said plate for engagement with said vertical slots.

3. An air brake retainer valve anchor comprising in combination a railway car, a thin, flat plate apertured adjacent one horizontal edge thereof and vertically slotted substantially in alignment with said apertures, said vertical slots being connected by a cross slot having an enlarged portion to permit penetration endwise of a conventional bolt, spacers between said car end and plate, bolts for securing said plate in place, which bolts pass through said distance pieces, a retainer valve, and conventional bolts for cooperatively engaging said vertical slots to secure vertical adjustment of said valve.

4. The combination with a railway car and an air brake retainer valve of a thin, flat plate for anchoring said valve to the car, distance pieces arranged between the car end and said plate, bolts passing through said car end distance pieces and plate, the heads of said bolts being contained in said car, said plate being vertically slotted to accept retainer valve bolts, which slot has an enlarged portion arranged at an inclination to permit insertion of said bolts through the front face of said plate.

5. The combination with a railway car and an air brake retainer valve of a thin, flat plate for anchoring said valve to the car, distance pieces arranged between the car end and said plate, bolts passing through said car end, distance pieces and plate, the heads of said bolts being contained in said car, said plate being vertically slotted to accept retainer valve bolts, and being further slotted in a manner including a cross slot arranged at an inclination to permit insertion of said bolts through the front face of said plate.

JOSEPH W. WEINLAND.